(12) United States Patent
Kropp

(10) Patent No.: US 8,578,999 B2
(45) Date of Patent: Nov. 12, 2013

(54) VARIABLE CLUTCH MECHANISM AND CORRECTION TAPE DISPENSER WITH VARIABLE CLUTCH MECHANISM

(75) Inventor: Andrew Kropp, Naperville, IL (US)

(73) Assignee: Sanford, L.P., Oak Brook, IL (US)

( * ) Notice: Subject to any disclaimer, the term of this patent is extended or adjusted under 35 U.S.C. 154(b) by 218 days.

(21) Appl. No.: 12/981,324

(22) Filed: Dec. 29, 2010

(65) Prior Publication Data

US 2012/0168090 A1 Jul. 5, 2012

(51) Int. Cl.
*B32B 37/26* (2006.01)
*B26F 3/02* (2006.01)
*B43L 19/00* (2006.01)
*F16H 13/10* (2006.01)

(52) U.S. Cl.
USPC ........... 156/577; 156/527; 156/579; 118/200; 118/257; 242/588; 242/588.3; 242/588.6; 242/160.2; 242/160.4; 242/170; 242/171; 206/411; 192/89.2; 192/79; 476/67

(58) Field of Classification Search
USPC ......... 156/523, 527, 538, 540, 574, 577, 579; 118/76, 200, 257; 225/46; 242/160.2, 242/160.4, 170, 171, 588, 588.2, 588.3, 242/588.6; 206/411; 192/79, 89.2; 476/67
See application file for complete search history.

(56) References Cited

U.S. PATENT DOCUMENTS

| | | |
|---|---|---|
| 198,777 A | 1/1878 | Nicholson |
| 2,907,190 A | 10/1959 | Pastor |
| 3,443,375 A | 5/1969 | Cielaszyk |
| 4,671,687 A | 6/1987 | Tamai |
| 4,704,185 A | 11/1987 | Fischer |
| 4,718,971 A | 1/1988 | Summers |
| 4,750,878 A | 6/1988 | Nix et al. |
| 4,826,562 A | 5/1989 | Ehlis |
| 4,849,064 A | 7/1989 | Manusch et al. |
| 4,851,074 A | 7/1989 | Hiromichi |

(Continued)

FOREIGN PATENT DOCUMENTS

| | | |
|---|---|---|
| CA | 2359324 A1 | 7/2000 |
| DE | 37 32 843 A1 | 3/1988 |

(Continued)

OTHER PUBLICATIONS

International Search Report and Written Opinion from corresponding International application No. PCT/US2011/052246, mailing date Dec. 23, 2011.

(Continued)

*Primary Examiner* — Mark A Osele
(74) *Attorney, Agent, or Firm* — Marshall, Gerstein & Borun LLP

(57) ABSTRACT

A clutch mechanism for a tape dispenser, for example, includes a first reel, a second reel, a biasing element, and a friction element. The first and second reels are rotatably disposed on first and second shafts. The biasing element is disposed between the first reel and shaft such that the first reel is movable in a radial direction relative to the first shaft. The friction element includes at least a portion that is disposed between the first reel and the second reel and arranged to generate a first normal force when the first reel is in a first position, relative to the first shaft, and a second normal force when the first reel is in a second position, relative to the first shaft.

28 Claims, 6 Drawing Sheets

(56) References Cited

U.S. PATENT DOCUMENTS

| | | | |
|---|---|---|---|
| 4,851,076 A | 7/1989 | Manusch et al. |
| 4,853,074 A | 8/1989 | Manusch et al. |
| 4,891,090 A | 1/1990 | Lorincz et al. |
| 4,891,260 A | 1/1990 | Kunkel et al. |
| 4,997,512 A | 3/1991 | Manusch |
| 5,006,184 A | 4/1991 | Manusch et al. |
| 5,049,229 A | 9/1991 | Czech |
| 5,125,589 A | 6/1992 | Manusch |
| 5,135,798 A | 8/1992 | Muschter et al. |
| 5,150,851 A | 9/1992 | Manusch et al. |
| 5,221,577 A | 6/1993 | Inaba et al. |
| 5,242,725 A | 9/1993 | Weissmann et al. |
| 5,281,298 A | 1/1994 | Poisson et al. |
| 5,303,759 A | 4/1994 | Czech |
| 5,310,437 A | 5/1994 | Tucker |
| 5,310,445 A | 5/1994 | Tucker |
| 5,316,613 A | 5/1994 | Samuelson et al. |
| 5,346,580 A | 9/1994 | Elges et al. |
| 5,379,477 A | 1/1995 | Tamai et al. |
| 5,380,395 A | 1/1995 | Uchida |
| 5,393,368 A | 2/1995 | Stevens |
| 5,430,904 A | 7/1995 | Ono et al. |
| 5,462,633 A | 10/1995 | Manusch et al. |
| 5,472,560 A | 12/1995 | Horng |
| 5,480,510 A | 1/1996 | Manusch et al. |
| 5,490,898 A | 2/1996 | Koyama |
| 5,499,877 A | 3/1996 | Sakanishi et al. |
| 5,507,908 A | 4/1996 | Fukushima et al. |
| 5,512,128 A | 4/1996 | Manusch et al. |
| 5,556,469 A | 9/1996 | Koyama et al. |
| 5,595,626 A | 1/1997 | Yokouchi et al. |
| 5,679,156 A | 10/1997 | Matsumaru |
| 5,685,944 A | 11/1997 | Nose et al. |
| 5,700,552 A | 12/1997 | Katsuro et al. |
| 5,714,035 A | 2/1998 | Stevens |
| 5,759,270 A | 6/1998 | Lee |
| 5,759,341 A | 6/1998 | Kobayashi |
| 5,770,007 A | 6/1998 | Czech et al. |
| 5,772,840 A | 6/1998 | Morinaga |
| 5,785,437 A | 7/1998 | Koyama et al. |
| 5,792,263 A | 8/1998 | Koyama et al. |
| 5,795,085 A | 8/1998 | Yoo |
| 5,820,728 A | 10/1998 | Stevens et al. |
| D400,585 S | 11/1998 | Fritz et al. |
| 5,891,562 A | 4/1999 | Rutz et al. |
| 5,897,742 A | 4/1999 | Semmler |
| 5,942,036 A | 8/1999 | You |
| 5,997,994 A | 12/1999 | Matsushima |
| 6,000,455 A | 12/1999 | Semmler |
| 6,059,002 A | 5/2000 | Katami |
| 6,062,286 A | 5/2000 | Koyama et al. |
| 6,065,887 A | 5/2000 | You |
| 6,079,660 A | 6/2000 | Manusch et al. |
| 6,105,650 A | 8/2000 | Manusch et al. |
| 6,112,796 A | 9/2000 | Stevens |
| 6,125,903 A | 10/2000 | Uchida |
| 6,145,770 A | 11/2000 | Manusch et al. |
| 6,162,492 A | 12/2000 | Narayanan |
| 6,206,072 B1 | 3/2001 | Orihara et al. |
| 6,227,274 B1 | 5/2001 | Koyama et al. |
| 6,235,364 B1 | 5/2001 | Katsuro et al. |
| 6,260,599 B1 | 7/2001 | You |
| 6,270,578 B1 | 8/2001 | Murakoshi |
| 6,273,162 B1 | 8/2001 | Ohara et al. |
| 6,273,169 B1 | 8/2001 | Ono et al. |
| 6,273,982 B1 | 8/2001 | Semmler |
| 6,321,815 B1 | 11/2001 | You |
| 6,321,816 B1 | 11/2001 | Koreska |
| 6,325,130 B1 | 12/2001 | Kageyama et al. |
| 6,331,352 B1 | 12/2001 | Bradley et al. |
| 6,352,770 B1 | 3/2002 | Nienaber et al. |
| 6,360,805 B1 | 3/2002 | Takahashi |
| 6,363,990 B1 | 4/2002 | Kozaki |
| 6,363,992 B1 | 4/2002 | Semmler |
| 6,379,461 B1 | 4/2002 | Masumoto |
| 6,418,997 B1 | 7/2002 | Tamai et al. |
| 6,422,284 B1 | 7/2002 | Kelders et al. |
| 6,432,515 B1 | 8/2002 | Titze et al. |
| 6,435,248 B1 | 8/2002 | Masumoto |
| 6,450,231 B1 | 9/2002 | Ishikawa |
| 6,453,969 B1 | 9/2002 | Ferrara |
| 6,454,856 B1 | 9/2002 | Jung |
| 6,461,068 B1 | 10/2002 | Holmes |
| 6,481,485 B1 | 11/2002 | Herrmannsen et al. |
| 6,499,524 B1 | 12/2002 | Miller et al. |
| 6,500,259 B1 | 12/2002 | Tamai et al. |
| 6,500,509 B1 | 12/2002 | Katsuro et al. |
| 6,521,045 B1 | 2/2003 | Koyama et al. |
| 6,558,058 B2 | 5/2003 | Masumoto |
| 6,565,657 B2 | 5/2003 | Huthmacher |
| 6,568,450 B1 | 5/2003 | Stevens |
| 6,575,220 B2 | 6/2003 | Tamai et al. |
| 6,582,514 B1 | 6/2003 | Yang |
| 6,595,260 B2 | 7/2003 | Tamai et al. |
| 6,599,363 B2 | 7/2003 | Narita |
| 6,601,632 B2 | 8/2003 | Bouveresse et al. |
| 6,620,238 B2 | 9/2003 | Tsuda et al. |
| 6,622,768 B2 | 9/2003 | You |
| 6,629,552 B1 | 10/2003 | Herrmannsen et al. |
| 6,641,141 B2 | 11/2003 | Schroeder |
| 6,675,856 B2 | 1/2004 | Kozaki |
| 6,681,827 B2 | 1/2004 | Tamai et al. |
| 6,702,491 B2 | 3/2004 | Kobayashi |
| 6,729,377 B2 | 5/2004 | Huthmacher |
| 6,730,186 B2 | 5/2004 | Takahashi |
| 6,732,781 B2 | 5/2004 | Bouveresse |
| 6,732,782 B2 | 5/2004 | Rollion |
| 6,739,369 B2 | 5/2004 | Watanabe |
| 6,745,808 B2 | 6/2004 | Kobayashi |
| 6,761,200 B2 | 7/2004 | Shinya |
| 6,769,470 B2 | 8/2004 | Tamai et al. |
| 6,776,209 B1 | 8/2004 | You |
| 6,783,293 B2 | 8/2004 | Watanabe et al. |
| 6,792,664 B2 | 9/2004 | Herrmannsen et al. |
| 6,796,355 B2 | 9/2004 | Huthmacher et al. |
| 6,802,354 B2 | 10/2004 | Bouveresse |
| 6,805,762 B2 | 10/2004 | Narita et al. |
| 6,808,565 B1 | 10/2004 | Koyama et al. |
| 6,817,398 B2 | 11/2004 | Huthmacher et al. |
| 6,830,089 B1 | 12/2004 | Tamai et al. |
| 6,852,409 B2 | 2/2005 | Bradley et al. |
| 6,896,734 B2 | 5/2005 | Nishioka et al. |
| 6,905,545 B2 | 6/2005 | Tominaga |
| 6,945,492 B2 | 9/2005 | Koreska |
| 6,951,431 B2 | 10/2005 | Rollion |
| 6,966,715 B2 | 11/2005 | Narita et al. |
| 6,997,229 B2 | 2/2006 | Marschand et al. |
| 7,044,187 B2 | 5/2006 | Bebensee et al. |
| 7,059,374 B2 | 6/2006 | Mitsui et al. |
| 7,063,120 B2 | 6/2006 | Huthmacher et al. |
| 7,093,641 B2 | 8/2006 | Sharp |
| 7,093,642 B2 | 8/2006 | Sharp et al. |
| 7,117,915 B2 | 10/2006 | Rolion |
| 7,118,064 B2 | 10/2006 | Schneider |
| 7,121,948 B2 | 10/2006 | Huthmacher et al. |
| 7,163,040 B2 | 1/2007 | Marschand et al. |
| 7,187,573 B2 | 3/2007 | Terada et al. |
| 7,201,961 B2 | 4/2007 | Narimatsu et al. |
| D541,863 S | 5/2007 | Gerules |
| D542,351 S | 5/2007 | Rolion et al. |
| D542,845 S | 5/2007 | Suzuki |
| D542,846 S | 5/2007 | Suzuki |
| D543,238 S | 5/2007 | Suzuki |
| D543,239 S | 5/2007 | Suzuki |
| D543,240 S | 5/2007 | Suzuki |
| D543,241 S | 5/2007 | Herrmannsen et al. |
| D543,242 S | 5/2007 | Rushe et al. |
| 7,228,882 B2 | 6/2007 | Marschand et al. |
| D549,322 S | 8/2007 | Stallard et al. |
| 7,275,578 B2 | 10/2007 | Mitsui et al. |
| 7,302,984 B2 | 12/2007 | Mitsui et al. |
| D562,404 S | 2/2008 | Jansen et al. |
| 7,325,583 B2 | 2/2008 | Watanabe |
| 7,334,622 B2 | 2/2008 | Stade |

(56) References Cited

U.S. PATENT DOCUMENTS

| | | |
|---|---|---|
| 7,374,625 B2 | 5/2008 | Panetta et al. |
| D570,917 S | 6/2008 | Bailey et al. |
| D570,918 S | 6/2008 | Rushe |
| D571,403 S | 6/2008 | Rolion et al. |
| D573,194 S | 7/2008 | Rushe et al. |
| D573,195 S | 7/2008 | Rushe et al. |
| D573,645 S | 7/2008 | Sommers et al. |
| D574,431 S | 8/2008 | Kouda |
| D574,432 S | 8/2008 | Kouda |
| D574,892 S | 8/2008 | Kouda |
| D577,117 S | 9/2008 | Biener et al. |
| D579,499 S | 10/2008 | Rushe et al. |
| 7,438,489 B2 | 10/2008 | Fujii |
| D579,980 S | 11/2008 | Rushe et al. |
| D579,981 S | 11/2008 | Maczuzak et al. |
| D580,497 S | 11/2008 | Dureiko et al. |
| D580,984 S | 11/2008 | Kouda |
| D588,644 S | 3/2009 | Kobayashi |
| D588,646 S | 3/2009 | Vulpitta |
| D591,354 S | 4/2009 | Vulpitta |
| RE40,885 E | 9/2009 | Sharp |
| D600,751 S | 9/2009 | Gallay |
| D603,903 S | 11/2009 | Gallay |
| D607,055 S | 12/2009 | Koreska |
| 7,681,616 B2 | 3/2010 | Marschand et al. |
| 7,713,606 B2 | 5/2010 | Kasahara et al. |
| 7,743,810 B2 | 6/2010 | Rolion et al. |
| D619,655 S | 7/2010 | Suzuki |
| D620,526 S | 7/2010 | Suzuki |
| D620,527 S | 7/2010 | Suzuki |
| D620,528 S | 7/2010 | Suzuki |
| 7,748,564 B2 | 7/2010 | Kinugasa et al. |
| D623,231 S | 9/2010 | Suzuki |
| 2002/0170683 A1 | 11/2002 | Tamai et al. |
| 2003/0062135 A1* | 4/2003 | Takahashi ............ 156/577 |
| 2003/0226733 A1 | 12/2003 | Huthmacher et al. |
| 2004/0031873 A1 | 2/2004 | Koreska |
| 2005/0072529 A1 | 4/2005 | Yonezawa et al. |
| 2005/0155717 A1 | 7/2005 | Mitsui et al. |
| 2006/0151119 A1 | 7/2006 | Klauck et al. |
| 2006/0151657 A1 | 7/2006 | Matsushita |
| 2007/0107851 A1 | 5/2007 | Marschand et al. |
| 2007/0189829 A1 | 8/2007 | Matsushita et al. |
| 2008/0078323 A1 | 4/2008 | Hyodo |
| 2008/0264753 A1 | 10/2008 | Rolion et al. |
| 2008/0277070 A1 | 11/2008 | Rolion et al. |
| 2008/0277517 A1 | 11/2008 | Hyodo |
| 2008/0283194 A1 | 11/2008 | Mitsui et al. |
| 2008/0308237 A1 | 12/2008 | Rolion et al. |
| 2009/0025884 A1 | 1/2009 | Kinugasa et al. |
| 2009/0026302 A1 | 1/2009 | Kinugasa et al. |
| 2009/0028620 A1 | 1/2009 | Kinugasa et al. |
| 2009/0050275 A1 | 2/2009 | Sakanishi |
| 2009/0179061 A1 | 7/2009 | Dureiko et al. |
| 2009/0202818 A1 | 8/2009 | Kasahara et al. |
| 2009/0266466 A1 | 10/2009 | Yamamoto et al. |
| 2010/0018653 A1 | 1/2010 | Dureiko et al. |
| 2010/0116440 A1 | 5/2010 | Kai et al. |
| 2010/0206488 A1 | 8/2010 | Matsushita et al. |

FOREIGN PATENT DOCUMENTS

| | | |
|---|---|---|
| DE | 38 34 097 C1 | 3/1990 |
| DE | 39 02 553 C1 | 4/1990 |
| DE | 38 42 350 A1 | 6/1990 |
| DE | 39 11 402 A1 | 10/1990 |
| DE | 40 34 145 A1 | 10/1991 |
| DE | 40 39 683 A1 | 6/1992 |
| DE | 41 04 331 A1 | 8/1992 |
| DE | 41 20 031 C1 | 10/1992 |
| DE | 42 17 294 A1 | 12/1993 |
| DE | 42 17 295 A1 | 12/1993 |
| DE | 42 20 712 A1 | 1/1994 |
| DE | 43 22 117 C1 | 11/1994 |
| DE | 196 05 811 C1 | 10/1996 |
| DE | 195 33 567 A1 | 3/1997 |
| DE | 196 04 617 A1 | 8/1997 |
| DE | 196 35 587 A1 | 3/1998 |
| DE | 298 01 395 U1 | 5/1998 |
| DE | 199 09 217 A1 | 9/1999 |
| DE | 198 24 551 A1 | 12/1999 |
| DE | 101 00 932 A1 | 7/2002 |
| DE | 201 21 351 U1 | 7/2002 |
| DE | 102 14 604 A1 | 10/2003 |
| DE | 10 2004 026 720 A1 | 12/2005 |
| EP | 0 064 358 A1 | 11/1982 |
| EP | 0 270 736 A1 | 6/1988 |
| EP | 0 427 870 A1 | 5/1991 |
| EP | 0 551 522 A1 | 7/1993 |
| EP | 0 679 597 A2 | 11/1995 |
| EP | 0 695 645 A1 | 2/1996 |
| EP | 0717000 A2 | 6/1996 |
| EP | 0 727 378 A1 | 8/1996 |
| EP | 0 755 889 A1 | 1/1997 |
| EP | 0 767 128 | 4/1997 |
| EP | 0 963 934 A1 | 12/1999 |
| EP | 1 306 338 A1 | 5/2003 |
| EP | 1 736 677 A1 | 12/2006 |
| EP | 1 808 395 A1 | 7/2007 |
| EP | 2 070 856 A1 | 6/2009 |
| FR | 2 559 221 A3 | 8/1985 |
| GB | 2 196 607 A | 5/1988 |
| IT | 287 492 | 7/1931 |
| JP | 4-275839 A | 10/1992 |
| JP | 4-281147 A | 10/1992 |
| JP | 4-283696 A | 10/1992 |
| JP | 4-294830 A | 10/1992 |
| JP | 4-312927 A | 11/1992 |
| JP | 4-316771 A | 11/1992 |
| JP | 4-319323 A | 11/1992 |
| JP | 4-327619 A | 11/1992 |
| JP | 4-327632 A | 11/1992 |
| JP | 4-338025 A | 11/1992 |
| JP | 4-345384 A | 12/1992 |
| JP | 4-354760 A | 12/1992 |
| JP | 4-367221 A | 12/1992 |
| JP | 4-371463 A | 12/1992 |
| JP | 6 127774 A | 5/1994 |
| JP | 10250290 A | 9/1998 |
| JP | 102050290 A | 9/1998 |
| JP | 2000 296696 | 10/2000 |
| JP | 2002-036686 A | 2/2002 |
| JP | 2002-067586 A | 3/2002 |
| JP | 2004-188804 A | 7/2004 |
| JP | 2004299249 A | 10/2004 |
| JP | 2005-178153 A | 7/2005 |
| JP | 2005-262448 A | 9/2005 |
| JP | 2005-271493 A | 10/2005 |
| JP | 2005-288981 A | 10/2005 |
| JP | 2006-068962 A | 3/2006 |
| JP | 2006-069031 A | 3/2006 |
| JP | 2006-069035 A | 3/2006 |
| JP | 2006-169415 A | 6/2006 |
| JP | 2006-181425 A | 7/2006 |
| JP | 2006-205443 A | 8/2006 |
| JP | 2006-348234 A | 12/2006 |
| JP | 2006-348236 A | 12/2006 |
| JP | 2007-069529 A | 3/2007 |
| JP | 2007-137966 A | 6/2007 |
| JP | 2007-161802 A | 6/2007 |
| JP | 2007-168146 A | 7/2007 |
| JP | 2007-175886 A | 7/2007 |
| JP | 2007-182534 A | 7/2007 |
| JP | 2007-196541 A | 8/2007 |
| JP | 2007-301835 A | 11/2007 |
| JP | 2007-326960 A | 12/2007 |
| JP | 2008-001023 A | 1/2008 |
| JP | 2008-023871 A | 2/2008 |
| JP | 2008-080660 A | 4/2008 |
| JP | 2008-093951 A | 4/2008 |
| JP | 2008-105194 A | 5/2008 |
| JP | 2008-156041 A | 7/2008 |
| JP | 2008-221556 A | 9/2008 |

(56) References Cited

FOREIGN PATENT DOCUMENTS

| | | |
|---|---|---|
| JP | 2008-221775 A | 9/2008 |
| JP | 2008-238650 A | 10/2008 |
| JP | 2008-254879 A | 10/2008 |
| JP | 2008-265042 A | 11/2008 |
| JP | 2008-279642 A | 11/2008 |
| JP | 2008-279719 A | 11/2008 |
| JP | 2008-307815 A | 12/2008 |
| JP | 2009-013199 A | 1/2009 |
| JP | 2009-137752 A | 6/2009 |
| JP | 2009-143065 A | 7/2009 |
| JP | 2009-154382 A | 7/2009 |
| JP | 2009-160761 A | 7/2009 |
| JP | 2009-255330 A | 11/2009 |
| JP | 2009-262347 A | 11/2009 |
| JP | 2009-262348 A | 11/2009 |
| JP | 2009-285883 A | 12/2009 |
| JP | 2009-285884 A | 12/2009 |
| JP | 2009-286046 A | 12/2009 |
| JP | 2009-297909 A | 12/2009 |
| JP | 2010-017855 A | 1/2010 |
| JP | 2010-017992 A | 1/2010 |
| JP | 2010-069827 A | 4/2010 |
| JP | 2010-076455 A | 4/2010 |
| JP | 2010-083086 A | 4/2010 |
| JP | 2010-105309 A | 5/2010 |
| WO | WO-97/46475 A1 | 12/1997 |
| WO | WO-98/41407 A1 | 9/1998 |
| WO | WO-99/37569 A1 | 7/1999 |
| WO | WO-2005/108113 A1 | 11/2005 |
| WO | WO-2005/108260 A1 | 11/2005 |
| WO | WO-2006/054895 A1 | 5/2006 |
| WO | WO-2006/128559 A1 | 12/2006 |
| WO | WO-2008/003714 A1 | 1/2008 |
| WO | WO-2008/038660 A1 | 4/2008 |
| WO | WO-2008/038661 A1 | 4/2008 |
| WO | WO-2008/078534 A1 | 7/2008 |
| WO | WO-2008/078535 A1 | 7/2008 |
| WO | WO-2008/078536 A1 | 7/2008 |
| WO | WO-2008/116702 A1 | 10/2008 |
| WO | WO-2008/133070 A1 | 11/2008 |
| WO | WO-2008/133071 A1 | 11/2008 |
| WO | WO-2008/149936 A1 | 12/2008 |
| WO | WO-2008/153659 A2 | 12/2008 |
| WO | WO-2009/026439 A1 | 2/2009 |
| WO | WO-2009/077494 A1 | 6/2009 |
| WO | WO-2010/015519 A1 | 2/2010 |
| WO | WO-2010/023229 A1 | 3/2010 |
| WO | WO-2010/038604 A1 | 4/2010 |

OTHER PUBLICATIONS

International Preliminary Report on Patentability for International Application No. PCT/US2011/052246, dated Jul. 2, 2013.

* cited by examiner

VARIABLE CLUTCH MECHANISM AND CORRECTION TAPE DISPENSER WITH VARIABLE CLUTCH MECHANISM

FIELD OF THE DISCLOSURE

The present disclosure is directed to clutch mechanisms and, more particularly, to correction tape dispensers having clutch mechanisms.

BACKGROUND

Correction tape dispensers can be used to cover mistakes made on a substrate, such as a sheet of paper, including writing or typing errors. In a common example, a correction tape dispenser includes a housing inside which a supply reel and a take-up reel are disposed. A carrier ribbon has a first end wound about the supply reel and a second end wound about a take-up reel. One side of the carrier ribbon is coated with a corrective coating that is used to cover a mistake on a substrate. Some known correction tape dispensers exist, which have supply and take-up reels that rotate about a common axis with the supply reel being coupled to drive the take-up reel through a clutch mechanism.

An applicator tip having a platform with a front edge is attached to the housing with the front edge being outside the housing. The applicator tip assists in the transfer of the corrective coating from the carrier ribbon to the paper.

The housing can be held in a consumer's hand during use. In passing from the supply reel to the take-up reel, the carrier ribbon is directed to the applicator tip, across the platform, around the front edge, and back to the take-up reel. The front edge of the applicator tip creates a sharp bend in the ribbon to assist in releasing the corrective coating from the ribbon. The front edge presses the carrier ribbon against the surface of a sheet of paper or other substrate in order to transfer the corrective coating from the carrier ribbon onto the paper so as to cover a mistake made thereon and to facilitate the correction of the mistake.

As the front edge is moved across the paper, carrier ribbon with a fresh corrective coating is drawn from the supply reel while the take-up reel is driven to wind up the carrier ribbon which has passed over the front edge and hence from which the corrective coating has been removed. Thus, a straight continuous strip of corrective coating is laid down on the paper surface until the forward movement of the applicator tip is stopped and the tip is lifted away from the paper.

With such correction tape dispensers, it is well known that the pulling force required to apply the correction tape to the substrate grows steadily throughout the life of the product while the torque required to draw the correction tape off of the supply reel remains substantially constant. The torque equals the pulling force multiplied by the radius of the correction tape stored on the supply reel. It is intuitive that the radius of the supply reel decreases as the supply of correction tape decreases. Therefore, to maintain a constant torque, the pulling force applied to the correction tape must be increased to offset the decrease in the radius of tape.

SUMMARY

The disclosed variable clutch mechanism advantageously regulates the amount of user effort required to move a supply of tape from a supply reel to a take-up reel of a tape transfer product, for example, while also facilitating the matching of the rotational speeds of the supply and take up reels throughout the lifetime of the tape transfer product, which in turn provides a more user friendly experience.

One aspect of the present disclosure provides a clutch mechanism including a first reel, a second reel, a biasing element and a friction element. The first reel is rotatably disposed on a first shaft. The second reel is rotatably disposed on a second shaft. The biasing element is disposed between the first reel and the first shaft such that the first reel is movable in a radial direction relative to the first shaft between a first position and at least a second position and the biasing element biases the first reel into the first position. The friction element is carried by the second reel and contacts a surface of the first reel such that the friction element generates a first frictional force between the first reel and the second reel when the first reel is in the first position and a second frictional force between the first reel and the second reel when the first reel is in the second position.

Another aspect of the present disclosure provides a tape dispenser including a housing, an applicator head, a first reel, a second reel, a biasing element, and a friction member. The applicator head is carried by the housing. The first reel is rotatably disposed on a first shaft within the housing. The second reel is rotatably disposed on a second shaft within the housing. The biasing element is disposed between the first reel and the first shaft such that the first reel is movable in a radial direction relative to the first shaft between a first position and at least a second position and the biasing element biases the supply reel into the first position. The friction element is carried by the second reel and contacts a surface of the first reel such that the friction element generates a first frictional force between the first reel and the second reel when the first reel is in the first position and a second frictional force between the first reel and the second reel when the first reel is in the second position.

Yet another aspect of the present disclosure provides a correction tape dispenser including a housing, a supply reel, a take-up reel, a carrier ribbon, a biasing element, and an o-ring. The housing carries an applicator head, a supply shaft, and a take-up shaft that is spaced from and parallel to the supply shaft. The supply reel is rotatably disposed on the supply shaft and defines a drive surface. The take-up reel is rotatably disposed on the take-up shaft adjacent to the supply reel. The carrier ribbon carries a supply of correction tape and extends from the supply reel, around the applicator head, and to the take-up reel. The biasing element is carried by the supply reel and disposed concentrically about the supply shaft at a location between the supply reel and the supply shaft. Moreover, the biasing element is rotatably disposed on the supply shaft and deformable to facilitate movement of the supply reel in a radial direction relative to the supply shaft between a first position and at least a second position and wherein the biasing element biases the supply reel into the first position. The o-ring is carried by and disposed concentrically about the take-up reel. Moreover, the o-ring contacts the drive surface of the supply reel such that the o-ring occupies a first state of compression generating a first frictional force between the supply reel and the take-up reel when the supply reel is in the first position, and a second state of compression generating a second frictional force between the supply reel and the take-up reel when the supply reel is in the second position.

A still further aspect of the present disclosure provides a clutch mechanism including a first reel, a second reel, and a friction element. The first reel is rotatably disposed on a first shaft. The second reel is rotatably disposed on a second shaft, and is spaced from and disposed parallel to the first shaft. The friction element is carried by and disposed concentrically about the second reel such that at least a portion of the friction element is disposed between and in contact with the first reel and the second reel to generate a frictional force therebetween.

A still yet further aspect of the present disclosure provides a tape dispenser including a housing, an applicator head, a supply reel, a take-up reel, and a friction element. The housing supports a supply shaft and a take-up shaft that is spaced from and parallel to the supply shaft. The applicator head is carried by the housing. The supply reel is rotatably disposed on the supply shaft within the housing and adapted to carry a supply of tape including a carrier ribbon carrying a marking tape adapted to be applied to a substrate by the applicator head. The take-up reel is rotatably disposed on the take-up shaft within the housing. The take-up reel is for collecting the carrier ribbon after the marking tape is applied to the substrate. The friction element is carried by and disposed concentrically about the take-up reel such that at least a portion of the friction element is disposed between the supply reel and the take-up reel to generate a frictional force therebetween.

A still further aspect of the present disclosure provides a correction tape dispenser including a housing, a supply reel, a take-up reel, a carrier ribbon, and an o-ring. The housing carries an applicator head, a supply shaft, and a take-up shaft that is spaced from and disposed parallel to the supply shaft. The supply reel is rotatably disposed on the supply shaft and defining a drive surface. The take-up reel is rotatably disposed on the take-up shaft adjacent to the supply reel. At least a portion of the carrier ribbon carries a supply of correction tape, and the carrier ribbon extending from the supply reel, around the applicator head, and to the take-up reel. The o-ring is carried by and disposed concentrically about the take-up reel. At least a portion of the o-ring is disposed between and in contact with the take-up reel and the drive surface of the supply reel such that the o-ring generates a frictional force between the supply reel and the take-up reel.

DETAILED DESCRIPTION

The present disclosure is directed to a variable clutch mechanism and a correction tape dispenser including a variable clutch mechanism to help ensure consistent application of the correction tape. The variable clutch mechanism described herein is not limited to being used in a correction tape dispenser, but rather, could foreseeably be used in any other device that might benefit from its functional aspects including but not limited to other transfer tape mechanisms such as mechanisms for transferring fluorescent "highlighter" type tapes or double-sided adhesive tapes, for example. The disclosed variable clutch mechanism advantageously reduces the difference in pulling force required to apply the correction tape throughout the lifetime of the product, and preferably facilitates the use of substantially the same pulling force to apply the correction (or other) tape to the substrate throughout the lifetime of the product, thereby making the device easier to use and more consistent over the lifetime of the product. Additionally, the variable clutch mechanism automatically adjusts the rate at which the take-up reel rotates relative to the supply reel to ensure that the tape ribbon is smoothly transferred from the supply reel such that the carrier ribbon is collected by the take-up reel without generating too much or too little tension in the correction tape ribbon and/or carrier ribbon, thereby avoiding operational inconsistencies such as stretching, tearing and/or looping.

Figure 1:
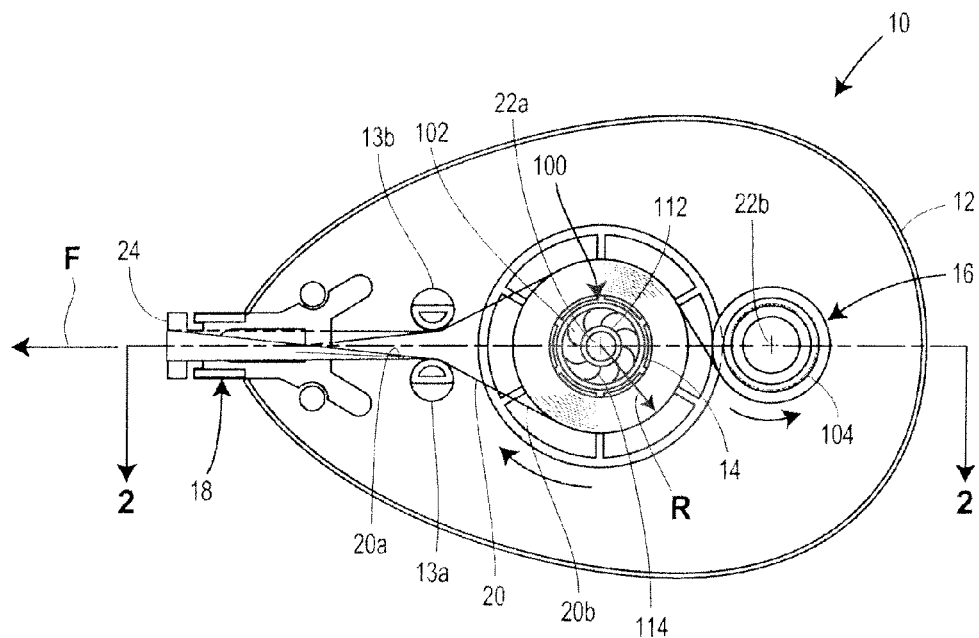
FIG. 1 is a side cross-sectional view of a correction tape dispenser including a variable clutch mechanism and constructed in accordance with the principles of the present disclosure.
Figure 2:
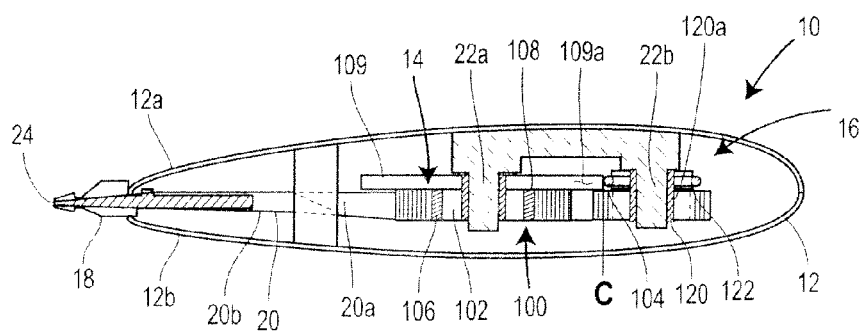
FIG. 2 is a top cross-sectional view of the correction tape dispenser of FIG. 1.
Figure 4A:
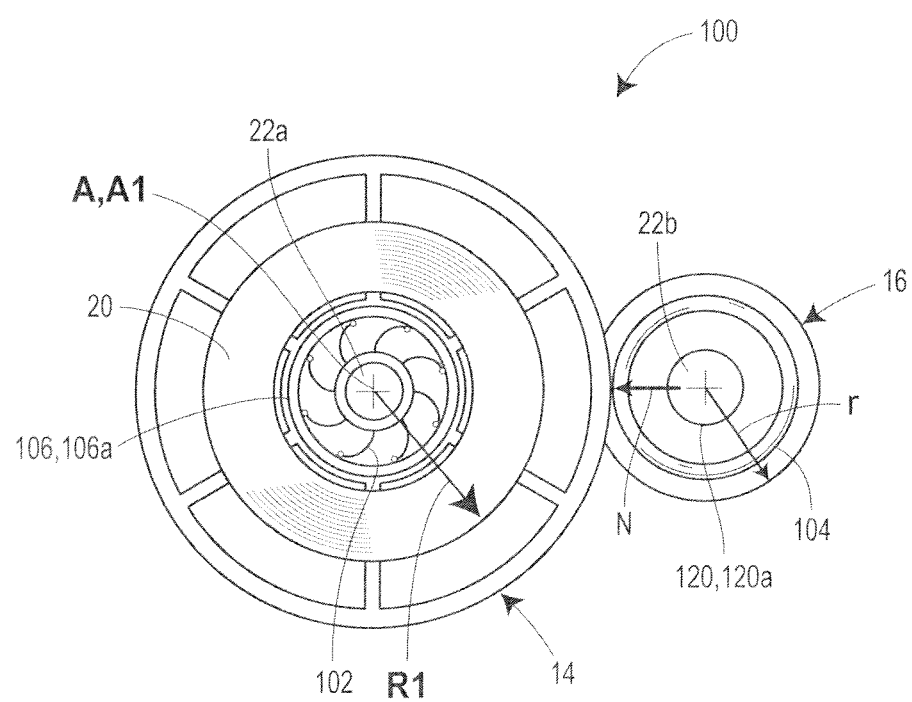
FIGS. 4A-4C are schematic side views of one embodiment of the variable clutch mechanism of the correction tape dispenser of FIGS. 1-3 in various states of operation.
Figure 4B:
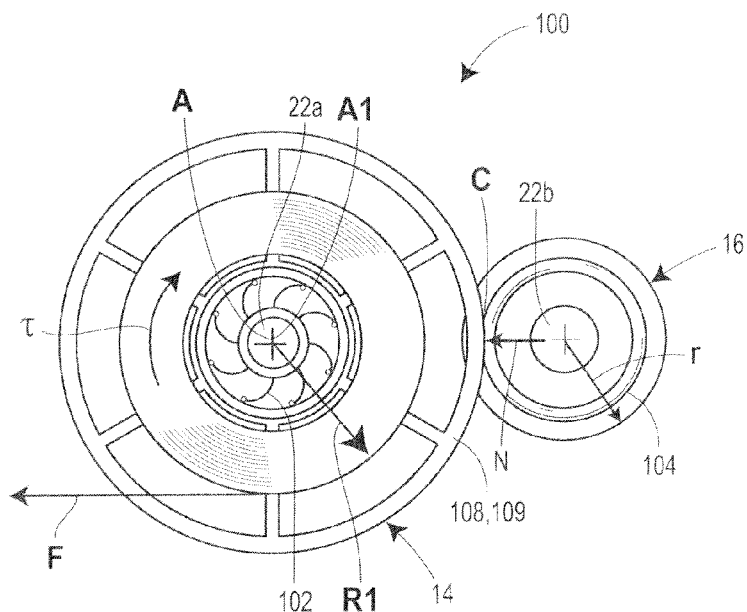
Figure 4C:
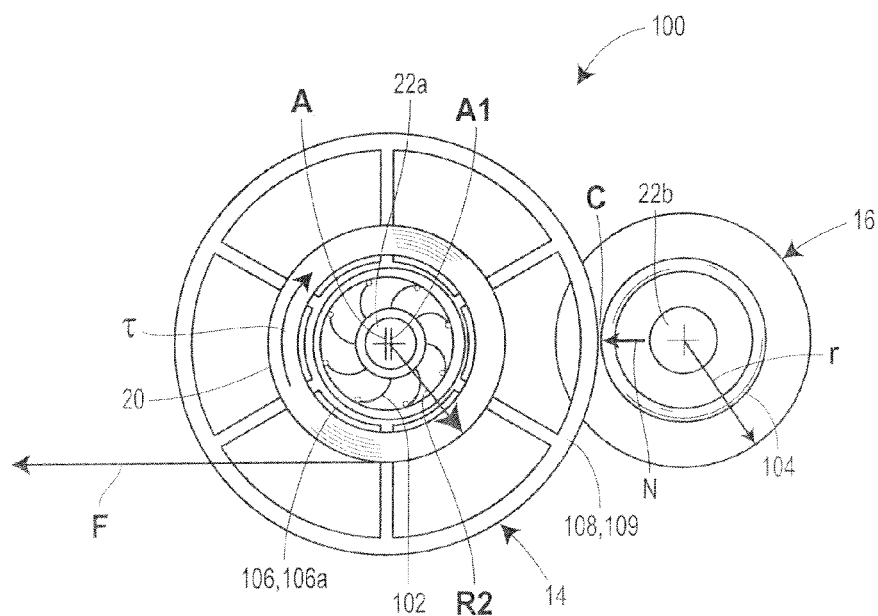

FIGS. 1 and 2 depict one embodiment of a correction tape dispenser 10 constructed in accordance with the principles of the present disclosure and including a variable clutch mechanism 100 (represented schematically in FIGS. 4A-4C). In general, the correction tape dispenser 10 includes a housing 12, a supply reel 14, a take-up reel 16, an applicator head 18, and a supply of correction tape ribbon 20. In the depicted form, the supply reel 14 is disposed between the take-up reel 16 and the applicator head 18 such that the take-up reel 16 is disposed opposite the supply reel 14 from the applicator head 18. Said another way, the supply reel 14 is disposed in closer proximity to the applicator head 18 than the take-up reel 16 is, which is in contrast to similar conventionally designed correction tape dispensers. The housing 12 includes a supply shaft 22a rotatably supporting the supply reel 14, and a take-up shaft 22b rotatably supporting the take-up reel 16. Additionally, as illustrated in FIG. 1, for example, the housing 12 includes a pair of guide posts 13a, 13b for guiding the correction tape 20 during operation of the tape dispenser 10, as will be discussed. In the disclosed embodiment, the supply and take-up shafts 22a, 22b are fixed in position relative to the housing 12, spaced apart from each other, and substantially parallel to each other, as illustrated.

The housing 12 is generally conventional in that it can include a pair of housing shells 12a, 12b (shown in FIGS. 2 and 3), for example, snapped or otherwise connected together to define a cavity that contains the other components of the dispenser 10. The supply and take-up reels 14, 16 of the present embodiment of the correction tape dispenser 10 generally include cylinders or cylindrically-shaped members, that are disposed on the supply and take-up shafts 22a, 22b, respectively, for rotational displacement. The applicator head 18 can resemble any conventional applicator head secured to the housing 12 and including an application edge 24. The correction tape ribbon 20 comprises a length of carrier ribbon 20a and a length of correction tape 20b bonded to the carrier ribbon 20a. The correction tape ribbon 20 extends from the supply reel 14, between the guide posts 13a, 13b, around the application edge 24 of the applicator head 18, back between the guide posts 13a, 13b, over any remaining supply of correction tape ribbon 20 carried by the supply reel 14, and to the take-up reel 16.

During operation, a user presses the application edge 24 of the applicator head 18 against a substrate such as a piece of paper, for example, and moves the correction tape dispenser 10 in a direction away from the applicator head 18. The correction tape 20b carried by the carrier ribbon 20a is formulated to adhere to the substrate. Therefore, the foregoing movement of the correction tape dispenser 10 applies or translates into a pulling force F, as shown in FIG. 1, which draws the correction tape ribbon 20 from the supply reel 14. This movement causes dispensation of the correction tape ribbon 20 from the housing 12 for application of the correction tape 20*b* such that it separates from the carrier ribbon 20*a* and adheres to the substrate. The spent carrier ribbon 20*a* is then collected on the take-up reel 16.

As discussed above, the pulling force F required to draw the correction tape ribbon 20 off of the supply reel 14 grows steadily throughout the life of the product. The pulling forces F grows because the torque required to draw the correction tape ribbon 20 off of the supply reel 14 remains substantially constant while the radius R of the correction tape ribbon 20 on the supply reel 14 decreases. A substantially constant torque is maintained such that the correction tape ribbon 20 may be drawn off of the supply reel 14 in a consistent manner. Thus, the user of conventional correction tape dispensers must apply a greater pulling force F to the correction tape ribbon 20 as the supply of correction tape ribbon 20 on the supply reel 14 begins to diminish. The correction tape dispenser 10 of the disclosed embodiment, however, includes the variable clutch mechanism 100 to reduce the negative consequences of this phenomena, as will be described.

Figure 3:
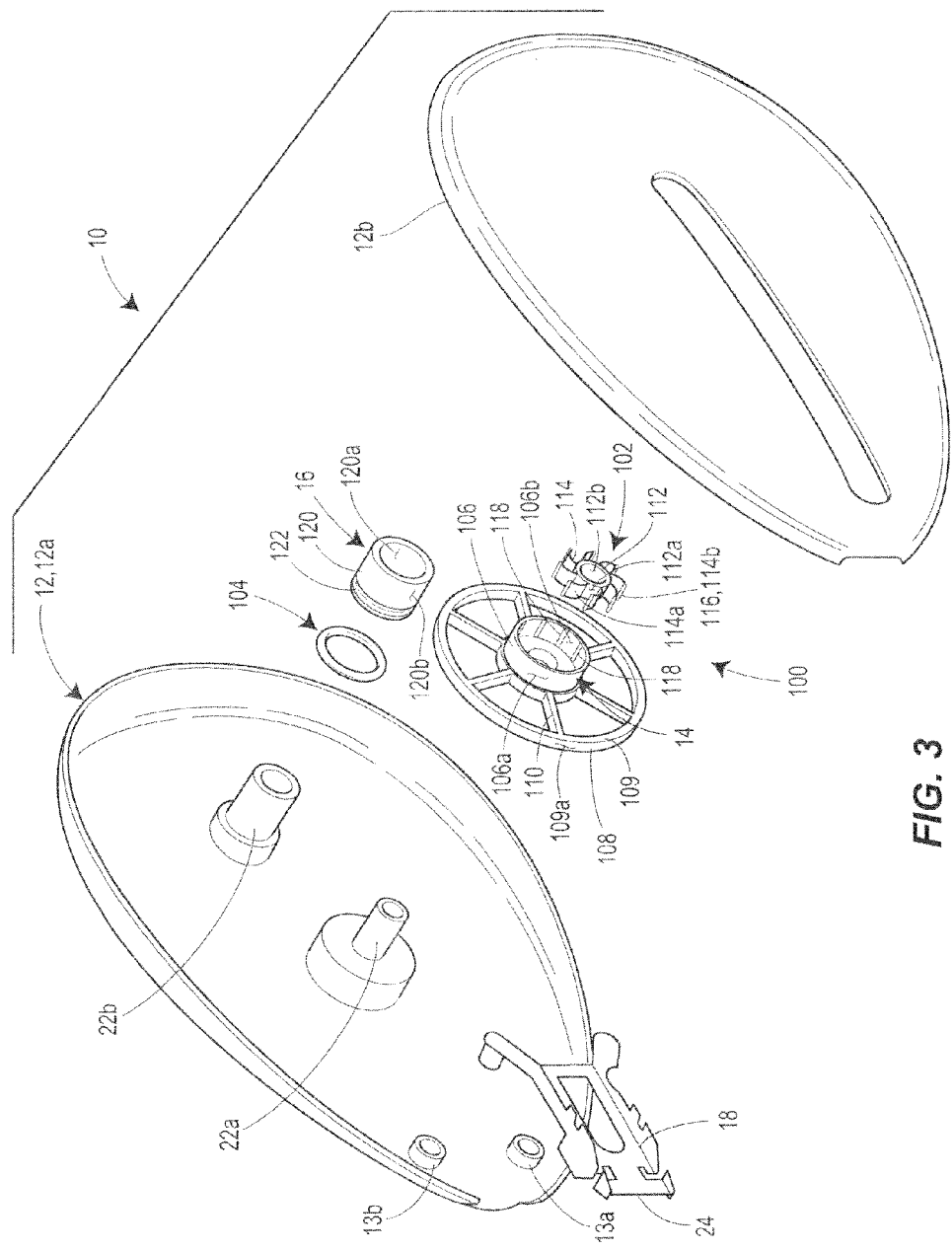
FIG. 3 is an exploded perspective view of the correction tape dispenser of FIGS. 1 and 2.

FIG. 3 illustrates the correction tape dispenser of FIGS. 1 and 2 in exploded perspective view, including the variable clutch mechanism 100. The variable clutch mechanism 100 includes the supply reel 14, the take-up reel 16, a biasing element 102, and a friction element 104. Each of these components can be constructed of a plastic material, a metal material, a composite material, or any other material suitable for the intended purpose.

The supply reel 14 includes a supply cylinder 106 and a drive wheel 108. The supply cylinder 106 constitutes a hollow cylinder defining an outer surface 106*a* and an inner surface 106*b*. The drive wheel 108 includes a drive rim 109 and a plurality of spokes 110. The drive rim 109 has a diameter greater than a diameter of the supply cylinder 106 and, as such, the spokes 110 extend radially inward from the drive rim 109 and are connected to the outer surface 106*a* of the supply cylinder 106 adjacent to an axial end of the supply cylinder 106. As such, the supply cylinder 106 and the drive wheel 108 are illustrated as a unitary component. While the drive wheel 108 has been described as including the rim 109 and the spokes 110, in alternative embodiments, the drive wheel 108 can include a solid disk-shaped structure, or any other structure suitable for the intended purpose. As mentioned, the supply cylinder 106 of the drive wheel 108 is hollow and defines the outer surface 106*a* and the inner surface 106*b*. The outer surface 106*a* of the supply cylinder 106 is adapted to support the supply of correction tape 20, as illustrated in FIGS. 1 and 2. The inner surface 106*b* of the supply cylinder 106 is adapted to accommodate the biasing element 102, which receives the supply shaft 22*a* and in turn supports the supply reel 14 on the supply shaft 22*a* of the housing 12.

For example, as shown in FIGS. 1 and 2, the biasing element 102 is adapted to be rotatably disposed on the supply shaft 22*a* at a location radially between the supply reel 14 and the supply shaft 22*a*. Generally, the biasing element 102 includes an elastic member such as a spring, for example, for facilitating movement of the supply reel 14 in a radial direction relative to the supply shaft 22*a* during operation of the correction tape dispenser 10, as will be described. In one embodiment, the biasing element 102 has a stiffness in a range of approximately 5 N/mm to approximately 100 N/mm. In the disclosed embodiment, the biasing element 102 includes what can be referred to as a radial spring having a hub 112 and a plurality of flexible fingers 114. The hub 112 includes a cylindrical member defining an outer surface 112*a* and an inner surface 112*b*. The inner surface 112*b* of the hub 112 is adapted to reside in direct contact with the supply shaft 22*a* of the housing 12 in a rotatable manner. Said another way, the hub 112 of the biasing element 102 is adapted to rotatably engage the supply shaft 22*a* of the housing 12, as shown in FIGS. 1 and 2. The flexible fingers 114 extend radially outward from the outer surface 112*a* of the hub 112 such that each flexible finger 114 includes a proximal end 114*a* attached to the outer surface 112*b* of the hub 112 and a distal end 114*b* spaced some distance away from the hub 112.

When assembled, and as shown in FIGS. 1 and 2, for example, the biasing element 102 is disposed inside of the supply cylinder 106 of the supply reel 14 in a manner such that the distal ends 114*b* of one or more of the flexible fingers 114 contact or otherwise engage the inner surface 106*b* of the supply cylinder 106. In some embodiments, the distal ends 114*b* of one or more of the flexible fingers 114 can be connected to the inner surface 106*b* of the supply cylinder 106. For example, in the disclosed embodiment, the distal end 114*b* of each flexible finger 114 is illustrated as including a protrusion 116 and the inner surface 106*b* of the central cylinder 106 of the supply reel 14 defines a corresponding plurality of recesses 118 for receiving the protrusions 116. As such, upon assembly, the protrusions 116 of the flexible fingers 114 are adapted to be inserted into the recesses 118, thereby securing the radial position of the biasing element 102 relative to the supply cylinder 106 of the supply reel 14. In the depicted form of the variable clutch mechanism 100, the protrusions 116 on the flexible fingers 114 include generally solid cylindrical formations formed integrally with the flexible fingers 114, and the recesses 118 in the supply cylinder 106 include corresponding generally cylindrical recesses. In alternative embodiments, however, the protrusions 116 and recesses 118 can be formed of generally any geometrical configuration suitable for the intended purpose. For example, in one embodiment, instead of the recesses 118, the central cylinder 106 of the supply reel 104 may define one or more protrusions in contact with the distal ends 114*b* of the fingers 114 of the biasing element 102 for maintaining the positional relationship of the inner cylinder 106 and the biasing element 102.

As shown in FIGS. 1 and 3, each of the flexible fingers 114 of the present embodiment of the biasing element 102 includes a substantially two-dimensional member having a curved profile when the biasing element 102 is viewed from a side perspective. Said another way, each of the flexible fingers 114 is arch-shaped, similar to a leaf spring, for example. Therefore, when the biasing element 102 of the presently disclosed form is viewed from the side orientation presented in FIG. 1, the flexible fingers 114 cause the biasing element 102 to have a whorl shape, for example. So configured, each of the flexible fingers 114 is adapted to flex in the radial direction relative to the supply shaft 22*a* under the influence of radially applied forces such that during operation of the correction tape dispenser 10, or other assembly incorporating the variable clutch mechanism, the entire supply reel 14 can move in a radial direction relative to the supply shaft 22*a*.

Still referring to FIG. 3, the take-up reel 16 of the presently disclosed embodiment includes a cylindrical member 120 defining an inner surface 120*a* and an outer surface 120*b*. The inner surface 120*a* of the cylindrical member 120 is adapted to reside in direct contact with the take-up shaft 22*b* of the housing 12 in a rotatable manner. Said another way, the cylindrical member 120 of the take-up reel 16 is adapted to rotatably engage the take-up shaft 22*b* of the housing 12, as shown in FIGS. 1 and 2. In the disclosed embodiment, the outer surface 120b of the cylindrical member 102 defines an annular recess 122 disposed adjacent to an axial end of the cylindrical member 120. The annular recess 122 is for receiving the friction element 104, which can include an o-ring, for example. As such, in the disclosed embodiment, the friction element 104 is carried by the take-up reel 16 and, more particularly, the cylindrical member 120 of the take-up reel 16. And as such, the friction element 104 is carried by and disposed concentrically about the take-up reel 16. The o-ring can comprise a silicone or an elastomeric material such as rubber. Alternatively, an o-ring or a washer made from a foam material may be used. While the foregoing description includes the friction element 104 and the take-up reel 16 being separate components assembled together, in an alternative embodiment, the friction element 104 and the take-up reel 16 could be co-molded. The band of material constituting the o-ring or washer can have a circular cross-section or any cross-section. The term o-ring is not intended to be limited to a band of any particular material having any particularly shaped cross-section, but rather, simply a piece of material arranged and configured to be suitable for the intended purpose.

With the tape dispenser 10 constructed as set forth above, the supply reel 14 is adapted to be rotatably disposed on the supply shaft 22a of the housing 12, and the take-up reel 16 is adapted to be disposed on the take-up shaft 22b of the housing 12. As shown in FIG. 2, when the take-up and supply reels 14, 16 are disposed on the respective shafts 22a, 22b, the drive rim 109 of the drive wheel 108 of the supply reel 14 lies in a common plane with the friction element 104 carried on the outer surface 120a of the cylindrical member 120 of the take-up reel 16. As such, at least a portion of the friction element 104 is disposed between the take-up reel 16 and the supply reel 14. More particularly, at least a portion of the friction element 104 is disposed between the cylindrical member 120 of the take-up reel 16 and the drive rim 109 of the drive wheel 108 of the supply reel 14. As shown, the friction element 104 contacts a drive surface 109a of the drive rim 109 at a point of contact C and applies a normal force N (shown in FIGS. 4A-4C) thereto. The drive surface 109a in the disclosed embodiment includes the radially outward facing surface of the drive rim 109. So configured, rotational displacement of the supply reel 14 can be transferred to rotational displacement of the take-up reel 16 through this point of contact C. The ratio at which such rotational displacement is transferred between reels 14, 16 is dependent on the magnitude of the friction generated at the point of contact C between the drive rim 109 and the friction element 104, which itself is dependent on the magnitude of the normal force N. The magnitude of the normal force N at the point of contact C is dependent on the operation of the variable clutch mechanism 100, as well as the coefficient of friction between the friction element 104 and the drive rim 109, for example, which itself is dependent on the material and dimensions of the friction element 104 and drive rim 109. In some embodiments, the coefficient of friction between the friction element 104 and the drive rim 109 can be in a range of approximately 0.1 to approximately 0.5, for example, about 0.35, about 0.40, about 0.45. To facilitate this, the friction element 104 is constructed of a resilient or compressible material, as discussed, and can have a stiffness in a range of approximately 2 N/mm to approximately 50 N/mm.

Reference will now be made to FIGS. 4A-4C to describe the operation of the variable clutch mechanism 100 as it is incorporated into the tape dispenser 10 described above. FIGS. 4A-4C schematically depict one embodiment of the variable clutch mechanism 100 constructed in accordance with the principles of the present disclosure and, which may be included in the tape dispenser 10 described above. The variable clutch mechanism 100 includes the supply reel 14, the take-up reel 16, the biasing element 102, and the friction element 104.

As illustrated and mentioned above, the supply and take-up reels 14, 16 are disposed on the supply and take-up shafts 22a, 22b, respectively, for rotational displacement. The supply reel 14 stores a supply of the correction tape ribbon 20 on the outer surface 106a of the supply cylinder 106. The take-up reel 16 stores a spent supply of the carrier ribbon 20a on the outer surface 120a of the cylindrical member 120. FIGS. 4A-4C depict the variable clutch mechanism 100 in various states of operation. FIG. 4A depicts the mechanism 100 in a state of rest, and wherein the supply of correction tape ribbon 20 on the supply reel 14 has a radius R1. FIG. 4B depicts the mechanism 100 in a state of initial operation, i.e., wherein the supply reel 14 includes a relatively large supply of correction tape ribbon 20, indicated to have the same radius R1 as that depicted in FIG. 4A. FIG. 4C depicts the mechanism 100 in a state of diminished operation, i.e., wherein the supply reel 14 includes a substantially diminished supply of correction tape ribbon 20, indicated to have a radius R2 that is smaller than the radius R1 depicted in FIGS. 4A and 4B.

In the state of rest depicted in FIG. 4A, the correction tape dispenser 10 is not being used, and therefore, no force F is being applied to draw the correction tape ribbon 20 off of the supply reel 14. Accordingly, an axis A of the supply cylinder 106, which corresponds to an axis of the drive rim 109 directly coincides with an axis A1 of the supply shaft 22a. Said another way, in the state of rest depicted in FIG. 4A, the supply reel 14 and the supply shaft 22a share a common axis.

Upon a user beginning to use the correction tape dispenser 10, as described above with reference to FIGS. 1 and 2, the user applies a force F to draw the supply of correction tape ribbon 20 off of the supply reel 14. The force F applied by the user imparts a torque on the supply reel 14, which constitutes the product of the force F multiplied by the radius R of the supply of correction tape ribbon 20. The torque τ initially causes the supply reel 14 to rotate in the clockwise direction, relative to the orientation of FIGS. 4A and 4B. During such rotation, friction generated at the point of contact C between the drive rim 109 and the friction element 104 imparts a rotational force to the take-up reel 16, thereby causing the take-up reel 16 to rotate in a counterclockwise direction relative to the orientation of FIGS. 4A-4C to thereby collect the spent carrier ribbon. During this initial state of operation, the radius R1 of the supply of correction tape ribbon 20 is larger than a radius r of the collection of spent carrier ribbon 20a on the take-up reel 16. Because the supply reel 14 and take-up reel 16 are therefore rotating at different rates, in order to avoid excessive tension or looping of the correction tape ribbon 20 during application of the tape 20b, the supply reel 14 must slip relative to the take-up reel 16. The amount of user effort required to cause the supply reel 14 to slip is directly dependent on the magnitude of the normal force N applied to the drive rim 109 by the friction element 104. Said another way, the ratio at which the take-up reel 16 rotates relative to the supply reel 14 depends on the magnitude of the normal force N, which impacts the amount of friction generated at the point of contact C. This can be further illustrated with reference to FIG. 4C.

FIG. 4C schematically depicts the correction tape dispenser 10 in a state of diminished supply of correction tape ribbon 20. Specifically, as mentioned, the supply of correction tape ribbon 20 on the supply reel 14 of FIG. 4C has a radius R2 that is smaller than the radius R1 shown in FIGS. 4A and 4B. Accordingly, when a user applies the force F to the supply reel 14 to draw the correction tape ribbon 20 off of the supply reel 14, the application force F must significantly increase to impart a torque τ on the supply reel 14 with a magnitude that is similar the magnitude of the torque τ imparted on the supply reel 14 depicted in FIGS. 4A and 4B. As a direct result of the increase in the application force F, the amount of radial load experienced by the supply cylinder 106 also increases, which causes the biasing element 102 to deform, as depicted in FIG. 4C. This deformation enables the supply cylinder 106 to move in the radial direction of the applied force F, which is to the left relative to the orientation of FIG. 4C and away from the take-up reel 16 and associated friction element 104. This is illustrated in FIG. 4C by the axis A of the supply cylinder 106 being displaced from the axis A1 of the supply shaft 22a in the direction of the force F. That is, as the force F is applied to the supply of correction tape 20, the radial force experienced by the supply cylinder 106 causes the supply cylinder 106 to compress a portion of the flexible fingers 114, as shown in FIG. 4C, which in turn allows the supply cylinder 106 to displace relative to the supply shaft 22a and away from the take-up reel 16. Moreover, because the supply cylinder 106 is fixed to the drive wheel 108, this displacement of the supply cylinder 106 also results in displacement of the drive wheel 108 and, more particularly, displacement of the drive rim 109 away from the friction element 104, thereby reducing the magnitude of the normal force N applied to the drive rim 109 by the friction element 104.

Accordingly, by reducing the magnitude of the normal force N, the area of the point of contact C in FIG. 4C is also reduced relative to the area of the point of contact C in FIG. 4B, for example. This reduced magnitude of the normal force N and the reduced area at the point of contact C results in reduced friction between the drive rim 109 and the friction element 104. Advantageously, this reduced friction enables the supply reel 14 to slip relative to the take-up reel 16 to ensure the smooth transfer of correction tape. That is, the supply reel 14 is able to more readily slip relative to the take-up reel 16, particularly when relatively larger application forces F are applied because the magnitude of the normal force N applied by the friction element 104 is reduced as a function of the amount of correction tape ribbon 20 carried on the supply reel 14. So configured, in FIG. 4C, the supply reel 14 slips relative to the take-up reel 16, which facilitates the ability of the take-up reel 16 to collect the used carrier ribbon 20a at substantially the same rate as the supply reel 14 dispenses the correction tape ribbon 20. Upon cessation of the user applying the force F to draw the correction tape ribbon 20 off of the supply reel 14, the biasing element 102 returns to its natural configuration and moves the supply reel 14 back to its state of rest depicted in FIG. 4A, for example.

In view of the foregoing, it should be appreciated that the variable clutch mechanism 100 depicted in FIGS. 4A-4C is arranged and configured to regulate the magnitude of the application force F required to draw correction tape ribbon 20 off of the supply reel 14, as a function of the amount of correction tape ribbon 20 carried by the supply reel 14, by varying the magnitude of the normal force N generated by the friction element 104. That is, when the correction tape dispenser 10 is relatively new and the supply reel 14 includes a relatively large supply of correction tape ribbon 20, the supply and take-up reels 14, 16 rotate at a substantially common rate because the drive rim 109 of the drive wheel 108 of the supply reel 14 is positioned in close proximity to the take-up reel 16, thereby generating a relatively large amount of friction between the friction element 104 and the drive rim 109. Said another way, when the correction tape dispenser 100 is new, only a minimum application force $F_{min}$ is required to draw correction off of the supply reel 14. The minimum application force $F_{min}$ is insufficient to deform the biasing member 102 and, as such, the drive rim 109 resides in close proximity to the friction element 104 to generate a large frictional force. Moreover, as discussed in the present disclosure, there is a natural tendency for the application force F to steadily increase as the supply of correction tape on the supply reel 14 diminishes. Accordingly, when the correction tape dispenser 100 is old and the supply of correction tape is nearly exhausted, a maximum application force $F_{max}$ is required to draw the correction tape off of the supply reel 14. This maximum application force $F_{max}$ is sufficient to deform the biasing element 102 and displace the drive rim 109 away from its original position in close proximity to the friction element 104 without entirely disengaging from the friction element 104, thereby reducing the amount of friction generated by the friction element 104, which in turn, facilitates slippage between the supply and take-up reels 14, 16.

Another advantage of the presently disclosed variable clutch mechanism 100, which can be attributed to the aforementioned deformation capability and associated advantage of reduced friction as great application forces are applied, is that the degree to which the force F increases is reduced by comparison to conventional constant clutch mechanisms. For example, some conventional constant clutch mechanisms can experience an approximately 82% increase in the application force F over the life of the supply of correction tape. By comparison, the application force F required over the life of the supply of correction tape using the presently disclosed variable clutch mechanism 100 has been determined to only increase approximately 40% (based on mathematical modeling).

As mentioned, the radius of the supply of correction tape ribbon 20 decreases as the supply of correction tape ribbon 20 on the supply reel 14 diminishes and, as such, the radius of the collected carrier ribbon 20a on the take-up reel 16 increases. Therefore, to ensure that the rate at which the correction tape ribbon 20 is drawn off of the supply reel 14 is substantially the same as the rate at which the carrier ribbon 20a is collected by the take-up reel 16, the rotational rate of the supply reel 14 must either increase, or the rotational rate of the take-up reel 16 must decrease. In the disclosed embodiment, the rotational rate of the supply reel 14 is increased relative to the rotational rate of the take-up reel 16 by reducing the magnitude of the normal force N applied to the drive rim 109 by the friction element 104, which in turn reduces the area of the point of contact C. The magnitude of the normal force N and the area of the point of contact C are reduced by allowing the force F to move the supply cylinder 106 and drive wheel 108, including the drive rim 109, from a first position depicted in FIGS. 4A and 4B to a second position that is further away from the friction element 104, as depicted in FIG. 4C, for example. This relatively reduced amount of friction allows the supply reel 14 to slip relative to the take-up reel 16, which enables the take-up reel 16 to collect the spent carrier ribbon at substantially the same rate that the correction tape is removed from the supply reel 14.

This variable clutch mechanism 100 therefore automatically adjusts the rate at which the take-up reel 16 rotates relative to the supply reel 14 to ensure that the correction tape ribbon 20 is smoothly transferred from the supply reel 14 and the carrier ribbon 20a is collected by the take-up reel 16 without generating too much or too little tension in the correction tape ribbon 20 and/or carrier ribbon 20a, thereby avoiding operational inconsistencies such as tearing and/or looping. In one practical example, to achieve the intended operational advantages, a ratio of the outer diameter of the drive rim 109 to the outer diameter of the friction element 104 can be in a range of approximately 2.5 to approximately 3.5, for example, about 3.0. Additionally, during the initial state of operation depicted in FIGS. 4A and 4B, for example, a ratio of the outer diameter of the starting supply of correction tape 20 on the supply reel 14 to the outer diameter of the starting collection of spent carrier ribbon 20b stored on the take-up reel 16 can be in a range of approximately 2.0 to approximately 3.0, for example, about 2.7, which then gradually decreases to a value of around 1.0, for example, over the life of the product.

Figure 5:
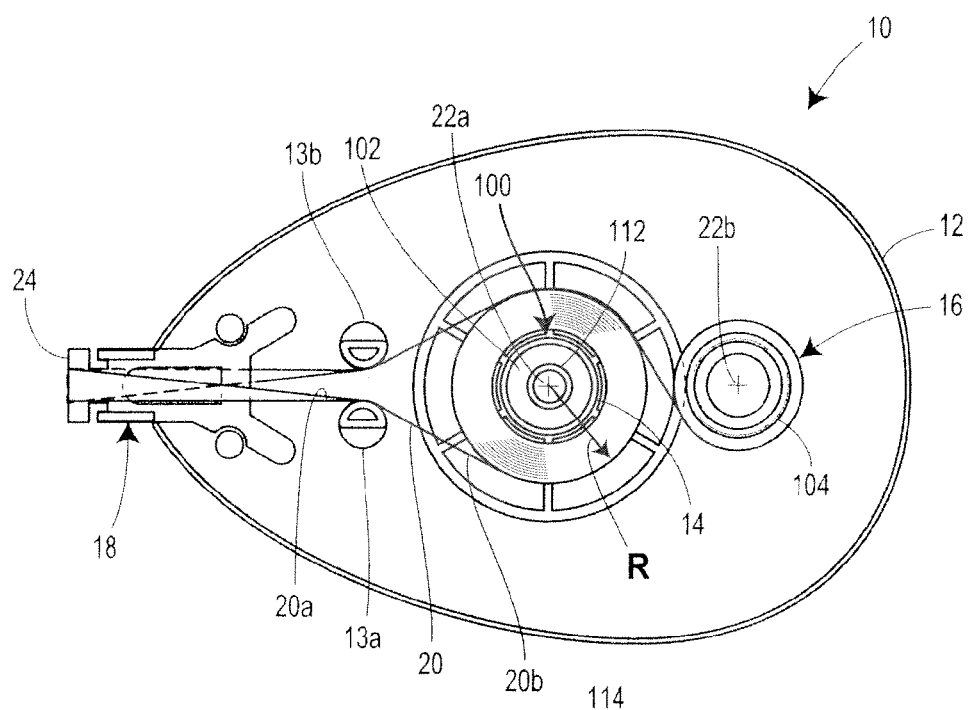
FIG. 5 is a side cross-sectional view of a correction tape dispenser including an alternative embodiment of a variable clutch mechanism constructed in accordance with the principles of the present disclosure.

While the biasing element 102 and the supply reel 14 of the above-described embodiment constitute separate components, in alternative forms of the variable clutch mechanism 100, the biasing element 102 and the supply reel 14 can be formed as one, e.g., integral, piece. Such a one-piece construction can be formed by injection molding, laser cutting, stereolithography, thermo-molding, blow-molding, casting, or generally any other suitable method. Moreover, while the biasing element 102 has been described as including the hub 112 and the plurality of flexible fingers 114, in alternative embodiments, the biasing element 102 can be constructed differently. For example, the biasing element 102 can alternatively include a disk-shaped member, similar to a washer, for example, such as that depicted in FIG. 5. The disk-shaped member could be constructed of a rubber material, a foam material, or any other material capable of resilient deformation in the radial direction, as described above. In embodiments that include a solid disk-shaped biasing element 102 such as that depicted in FIG. 5, the biasing element 102 could resiliently deform at its outer circumferential edge 102b via compression by the supply cylinder 106, as described above with respect to the biasing element 102 depicted in FIGS. 4A-4C. Alternatively, the disk-shaped biasing element 102 could resiliently deform at its inner circumferential 102a via compression against the supply shaft 22a.

Figure 6:
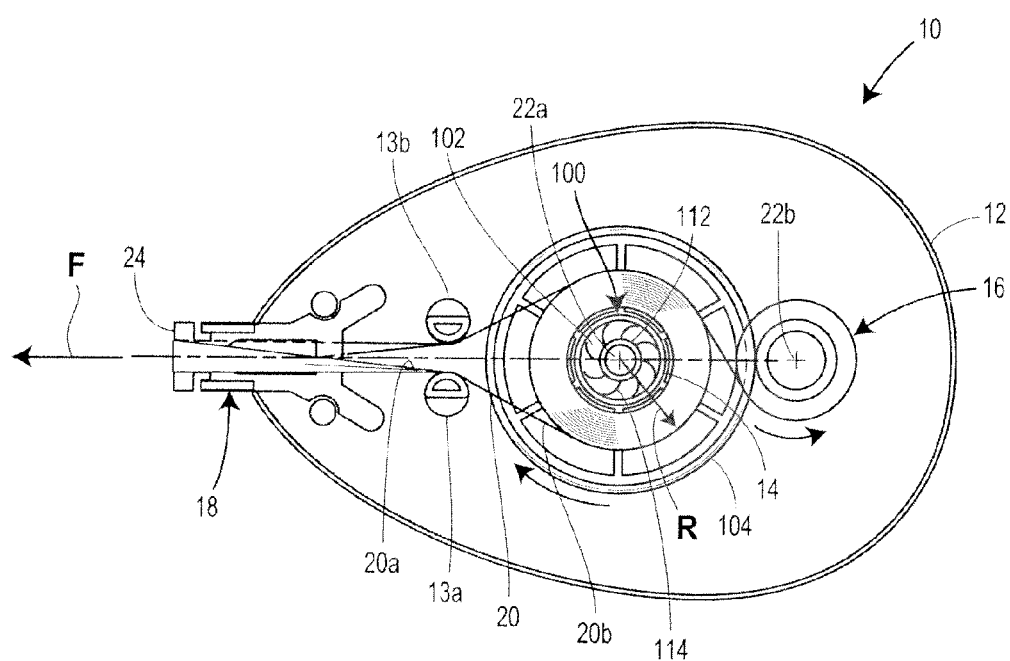
FIG. 6 is a side cross-sectional view of a correction tape dispenser including another alternative embodiment of a variable clutch mechanism constructed in accordance with the principles of the present disclosure.

Furthermore, while the friction element 104 has been described and depicted as being carried by and disposed concentrically about the take-up reel 16, in other embodiments, the friction element 104 could be carried by and disposed concentrically about the supply reel 14. For example, as depicted in FIG. 6, the friction element 104 could include an o-ring carried by and disposed concentrically about the drive surface 109a of the drive rim 109 of the supply reel 14. So configured, the variable clutch mechanism would function generally the same as that described above, with the exception that the friction element 104 would displace away from the take-up reel 16 as the application force F increased and compressed the biasing element 102. Accordingly, it should be appreciated that the friction element 104 of the present disclosure could be carried by and disposed concentrically about the supply reel 14 or the take-up reel 16.

Further still, while the friction element 104 has been described as including a silicone or elastomeric material, in other embodiments, the friction element 104 can include any other type of material capable of creating friction between the supply and take-up reels 14, 16. For example, the friction element 104 could include a clutch plate, a flat rubber washer, a viscous fluid, or generally any other configuration of materials and/or components capable of generating variable friction in the manner described herein.

While the present disclosure has expressly described various embodiments of variable clutch mechanisms, the invention is not intended to be limited by any of the features described herein. Rather, the invention is to be defined by the spirit and scope of the following claims, including all equivalents thereof.

What is claimed:

1. A clutch mechanism, comprising:
a first reel rotatably disposed on a first shaft;
a second reel rotatably disposed on a second shaft;
a biasing element disposed between the first reel and the first shaft such that the first reel is movable in a radial direction relative to the first shaft between a first position and at least a second position and the biasing element biases the first reel into the first position; and
a friction element, at least a portion of the friction element disposed between the first reel and the second reel and arranged to generate a first normal force when the first reel is in the first position and a second normal force when the first reel is in the second position
wherein the biasing element comprises a hub rotatably disposed on the first shaft and a plurality of flexible fingers extending radially away from the hub, the flexible fingers having proximal ends connected to the hub and distal ends spaced away from the hub, wherein one or more of the distal ends contacts the first reel.

2. The mechanism of claim 1, wherein the friction element is carried by and disposed concentrically about the first reel or the second reel.

3. The mechanism of claim 1, wherein the biasing element is rotatably disposed on the first shaft between the first reel and the first shaft.

4. The mechanism of claim 1, wherein the distal ends of the flexible fingers are connected to the first reel.

5. The mechanism of claim 1, wherein each of the flexible fingers comprises an arch-shaped flexible finger.

6. The mechanism of claim 1, wherein the first reel and the biasing element are separate components.

7. The mechanism of claim 1, wherein the first reel and the biasing element are constructed as one-piece.

8. The mechanism of claim 1, wherein the friction element is co-molded with the first reel or the second reel.

9. The mechanism of claim 1, wherein the friction element comprises an elastomeric o-ring.

10. The mechanism of claim 1, wherein the first shaft is spaced from and disposed parallel to the second shaft.

11. The mechanism of claim 1, wherein the distal end of each flexible finger includes a protrusion and an inner surface of the first reel includes a corresponding plurality of recesses for receiving the protrusions.

12. A tape dispenser, comprising:
a housing;
an applicator head carried by the housing;
a first reel rotatably disposed on a first shaft within the housing;
a second reel rotatably disposed on a second shaft within the housing;
a biasing element disposed between the first reel and the first shaft such that the first reel is movable in a radial direction relative to the first shaft between a first position and at least a second position and the biasing element biases the supply reel into the first position; and
a friction element, at least a portion of the friction element disposed between the first reel and the second reel and arranged to generate a first normal force when the first reel is in the first position and a second normal force when the first reel is in the second position,
wherein the biasing element comprises a hub rotatably disposed on the first shaft and a plurality of flexible fingers extending radially away from the hub, the flexible fingers having proximal ends connected to the hub and distal ends spaced away from the hub, wherein one or more of the distal ends contacts the first reel.

13. The tape dispenser of claim 12, wherein the friction element is carried by and disposed concentrically about the first reel or the second reel.

14. The tape dispenser of claim 12, wherein the first reel comprises a supply reel adapted to carry a supply of tape including a carrier ribbon and a marking tape adapted to be applied to a substrate by the applicator head, and the second reel comprises a take-up reel for collecting the carrier ribbon after the marking tape is applied to the substrate.

15. The tape dispenser of claim 12, wherein the biasing element is rotatably disposed on the first shaft between the first reel and the first shaft.

16. The tape dispenser of claim 12, wherein the distal ends of the flexible fingers are connected to the first reel.

17. The tape dispenser of claim 12, wherein each of the flexible fingers comprises an arch-shaped flexible finger.

18. The tape dispenser of claim 12, wherein the first reel and the biasing element are separate components.

19. The tape dispenser of claim 12, wherein the first reel and the biasing element are constructed as one-piece.

20. The tape dispenser of claim 12, wherein the friction element is co-molded with the first reel or the second reel.

21. The tape dispenser of claim 12, wherein the friction element comprises an elastomeric o-ring.

22. The tape dispenser of claim 12, wherein the first shaft is spaced from and parallel to the second shaft.

23. The tape dispenser of claim 12, wherein the first reel is disposed between the applicator head and the second reel.

24. The tape dispenser of claim 12, wherein the distal end of each flexible finger includes a protrusion and an inner surface of the first reel includes a corresponding plurality of recesses for receiving the protrusions.

25. The tape dispenser of claim 12, wherein the distal end of each flexible finger includes a protrusion and an inner surface of the supply reel includes a corresponding plurality of recesses for receiving the protrusions.

26. A correction tape dispenser, comprising:
a housing carrying an applicator head, a supply shaft, and a take-up shaft that is spaced from and parallel to the supply shaft;
a supply reel rotatably disposed on the supply shaft and defining a drive surface;
a take-up reel rotatably disposed on the take-up shaft adjacent to the supply reel;
a carrier ribbon carrying a supply of correction tape, the carrier ribbon extending from the supply reel, around the applicator head, and to the take-up reel;
a biasing element carried by the supply reel and disposed concentrically about the supply shaft between the supply reel and the supply shaft, the biasing element rotatably disposed on the supply shaft and deformable to facilitate movement of the supply reel in a radial direction relative to the supply shaft between a first position and at least a second position and wherein the biasing element biases the supply reel into the first position; and
an o-ring carried by and disposed concentrically about the take-up reel, the o-ring contacting the drive surface of the supply reel such that the o-ring occupies a first state of compression generating a first frictional force between the supply reel and the take-up reel when the supply reel is in the first position, and a second state of compression generating a second frictional force between the supply reel and the take-up reel when the supply reel is in the second position,
wherein the biasing element comprises a hub rotatably disposed on the supply shaft and a plurality of flexible fingers extending radially away from the hub, the flexible fingers having proximal ends connected to the hub and distal ends spaced away from the hub, wherein one or more of the distal ends contacts the supply reel.

27. The tape dispenser of claim 26, wherein the distal ends of the flexible fingers are connected to the supply reel.

28. The tape dispenser of claim 26, wherein each of the flexible fingers comprises an arch-shaped flexible finger.

* * * * *